United States Patent [19]

Van Ruyven

[11] Patent Number: 4,952,015
[45] Date of Patent: Aug. 28, 1990

[54] RADIATION COUPLING DEVICE

[75] Inventor: Lodewijk Van Ruyven, Eindhoven, Netherlands

[73] Assignee: U.S. Philips Corp., New York, N.Y.

[21] Appl. No.: 334,942

[22] Filed: Apr. 6, 1989

[30] Foreign Application Priority Data

Apr. 12, 1988 [NL] Netherlands ................ 8800939

[51] Int. Cl.$^5$ .............................................. G02B 6/10
[52] U.S. Cl. ................................. 350/96.12; 350/96.14
[58] Field of Search ............... 350/96.11, 96.12, 96.13, 350/96.14

[56] References Cited

U.S. PATENT DOCUMENTS

| | | | |
|---|---|---|---|
| 4,159,452 | 6/1979 | Logan et al. | 350/96.12 X |
| 4,652,076 | 3/1987 | Unger | 350/96.12 |
| 4,679,892 | 7/1987 | Haisma et al. | 350/96.12 |
| 4,690,489 | 9/1987 | Neyer | 350/06.14 |
| 4,838,634 | 6/1989 | Bennion et al. | 350/96.12 |

FOREIGN PATENT DOCUMENTS

0057587 8/1982 European Pat. Off. .
0152991 8/1985 European Pat. Off. .

Primary Examiner—William L. Sikes
Assistant Examiner—Akm E. Ullah
Attorney, Agent, or Firm—William L. Botjer

[57] ABSTRACT

A radiation coupling device comprising at least three radiation guides a first radiation guide of which is divided on at least one end into at least two further radiation guides. According to the invention the radiation guides form part of a semiconductor layer structure having, in a cross-section in the direction of thickness, at least two radiation guiding layers each comprising a further radiation guide. The layers are optically separated by a passive layer which locally shows a strip-shaped reduction in thickness or an interruption where the two radiation guiding layers respectively are present within each other's amplification profile or coincide and thus form the first radiation guide.

6 Claims, 5 Drawing Sheets

RADIATION COUPLING DEVICE

BACKGROUND OF THE INVENTION

The invention relates to a device for coupling electromagnetic radiation, comprising at least a first strip-shaped radiation guide which on at least one end bifurcates into at least two further strip-shaped radiation guide, which radiation guides are all bounded by a material having a smaller refractive index for the said radiation than the radiation guides.

Such coupling devices are suitable inter alia for use as a wavelength multiplexing and demutiplexing device in optical glass fibre communication systems and as an optical coupling device in an optical glass fibre gyroscope. More in general these coupling devices which in a certain respect may be considered as the solid-state analogon of a semi-permeable mirror may constitute an important part of opto electronic devices which are referred by to the term "integrated optics".

A coupling device of the type described is known from European Patent Application published under no. EP 0152991. This Application describes an integrated wavelength multiplexing and demultiplexing device consisting of a strip-shaped radiation guide which is provided on a substrate and which at each end bifurcates into two further strip-shaped radiation guides. All radiation guides are bounded by a material having a smaller refractive index for the radiation used than the radiation guides. This device will hereinafter be referred to by the term "horizontal double Y-shaped structure". This structure may be considered to be built up of two single horizontal Y-shaped structures. In the above-mentioned Patent Application glass, lithium-niobate and gallium arsenide are mentioned as materials from which the devide may be formed. In the case in which the substrate consists, for example, of lithium niobate, a certain number of titanium atoms per cm$^3$ may locally be provided so that the refractive index at that area becomes larger. In this manner radiation guides can be made. For use of the device as described in the said Patent Application the width of the strip-shaped radiation guides should satisfy certain requirements which will not be further discussed here.

A disadvantage of the known device is that it occupies a comparatively large part of the substrate surface. In fact, in case, for example, of a horizontal Y-shaped structure, the surface area required herefor as a result of the necessarily gradual bifurcation of the two further radiation guides is larger than the overall area of the radiation guides, in this example three. However, the following effect is even more important: it must be possible to connect active or passive optoelectronic components to the free ends of the two further radiation guides. These often have dimensions of a few hundreds of microns. Therefore the free ends of the further radiation guides must be situated at a distance from each other of, for example, a few hundred—say 200—$\mu$m. Due to the necessarily gradual bifurcation mentioned hereinbefore —which means, for example, that the tangent of the angle between the two further radiation guides must be smaller than 1/60—the necessary length of the further radiation guides becomes very large. For the given numbers the length must be larger than 60×200 $\mu$m (=12 mm).

A further disadvantage associated with the disadvantage mentioned hereinbefore is, that each active or passive optoelectronic component which is integrated with the device and is coupled to one of the three radiation guides of the Y-shaped structures occupies a part of the surface.

Finally a technological disadvantage must be mentioned, that is to say a disadvantage which is bound to the manufacturing method. It will be obvious that due to the fact that it is very desirable that both the thickness and the width of the strip-shaped radiation guides should by very uniform, stronger requirements must be imposed on these processes during the manufacture of a structure having several radiation guides by means of growing and diffusion or etching when the surface of the structure is comparatively large.

One of the objects of the invention is to avoid the said disadvantages to a considerable extent and notably to make the surface necessary for realising the device including the surface which is necessary for active or passive opto-electronic components connected to the device and integrated therewith as small as possible.

SUMMARY OF THE INVENTION

The invention is inter alia based on the recognition that the end in view can be reached by making an efficacious use of an extra dimension in the manufacture of a Y-shaped structure consisting of radiation guides.

For that purpose, a coupling device of the type mentioned in the opening paragraph is characterized according to the invention in that the radiation guides form part of a semiconductor layer structure having in a cross-section in the direction of thickness, at least two radiation-guiding active layers which each comprise a further strip-shaped radiation guide and are separated by a passive layer having a lower refractive index for the said radiation, the passive layer locally showing a strip-shaped reduction in thickness or an interruption, and at the area of the reduction in thickness or the interruption the two active layers respectively are in the amplification profile of each other or unite to form one active layer and constitute the first radiation guide.

In the device according to the invention it is possible inter alia that in the case of a Y-shaped structure of strip-shaped radiation guides the two further strip-shaped radiation guides after the bifurcation are situated above each other and hence do not occupy more of the surface of the substrate than one individual radiation guide. In this case there may be referred to a "vertical Y-shaped structure". A coupling device according to the invention may also be constructed for two vertical Y-shaped structures. In that case there may be referred to a double Y-shaped structure in which what has been said hereinbefore applies with respect to the surface gain for each of the y-shaped structures. The number of radiation guides in which a radiation guide may be divided is just as for a horizontal construction not restricted to two and this neither in a horizontal construction. Perhaps unnecessary to note that combinations consisting of one or more horizontal Y-shaped structures with one or more vertical Y-shaped structures are also possible. Nor is it strictly necessary for the further radiation guides to be situated exactly or substantially exactly over each other. At least one of the further radiation guides may enclose an angle with at least one of the remaining further radiation guides. It is required that at least two of the further radiation guides are situated in two active layers separated from each other by a passive layer.

Optionally present active or passive opto-electronic semiconductor components, in as far as they are present on that side of the bifurcation where at least two radiation guides are situated one over the other, may also be placed one over the other. The semiconductor layers forming part of these components may entirely or partly by the same as the layers required for the vertical Y-shaped structure. This involves that such components together with the vertical Y-shaped structure can be provided in one growing process. The packing density of the said opto-electronic components also increases in this manner so that the required surface may be reduced.

In as far as the coupling of glass fibres to a vertical Y-structure is concerned, reference is made to the examples to be described hereinafter.

One of the above mentioned advantages with regard to the method of manufacturing a double vertical Y structure with respect to a horizontal double Y structure may be explained as follows: when the radiation guides are present in a layer consisting of gallium arsenide which is bounded in the direction of thickness by an aluminium-gallium arsenide layer having a small refractive index, the optical guiding in the direction of width of the radiation guides is still lacking. This may be realised by locally bringing zinc atoms in the gallium arsenide layer, for example, by means of a local diffusion using a mask. In case of a vertical double Y-shaped structure such a diffusion may take place while using only one strip-shaped mask. Since both the surface and the circumference of the said mask are smaller than in the case of a horizontal double Y-shaped structure the uniformity of the width of the radiation guides and of, for example, the refractive index in the regions of the gallium arsenide layers situated beside the radiation guides will be better within an hozizontal Y-shaped structure.

BRIEF DESCRIPTION OF THE DRAWINGS

The invention will now be described in greater detail with reference to a few examples and the drawing in which.

The Figures are diagrammatic and are not drawn to scale in which in particular the dimensions in the direction of thickness ar exaggerated for clarity. Corresponding parts are as a rule referred to by the same reference numerals in the various examples. Semiconductor regions of the same conductivity type are as a rule shaded in the same direction in the cross-sectional views.

DETAILED DESCRIPTION OF THE PREFERRED EMBODIMENTS

Figure 1:
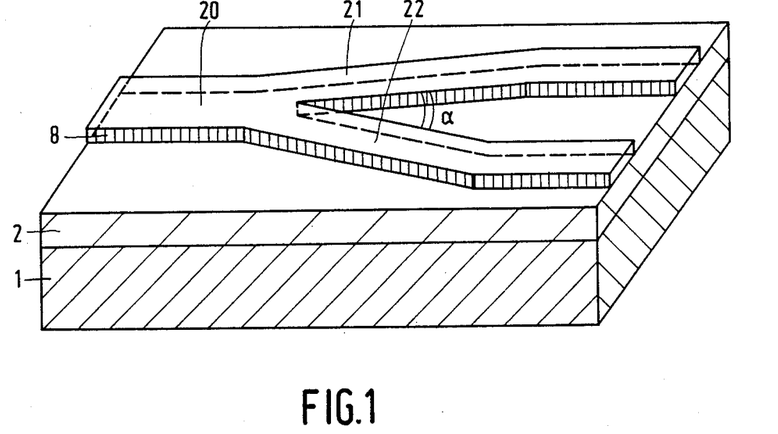
FIG. 1 is a diagrammatic perspective view of a known coupling device.

FIG. 1 is a diagrammatic perspective view of a known device for coupling electromagnetic radiation. The coupling device comprises a semiconductor body having a semiconductor substrate 1 consisting of monocrystalline gallium arsenide on which are provided a first semiconductor layer 2 and a second semiconductor layer 8 having a larger refractive index than the first semiconductor layer. A first strip-shaped radiation guide 20 which on at least one end bifurcates into two further strip-shaped radiation guides 21 and 22 is present in the second semiconductor layer 8, which radiation guides are all bounded by a material having a smaller refractive index for the said radiation than the radiation guides. The known device will hereinafter be referred to as "horizontal Y-shaped structure". For a good operation of the said coupling device it is necessary inter alia that the tangent of the angle which the two further radiation guides enclose with each other (before they start extending in parallel) is smaller than or equal to 1/60. When a semiconductor component or a glass fibre having dimensions which in practice are between 50 and 200 $\mu$m is to be connected to the end of the two further radiation guides 21 and 22, this involves that the distance between the two ends of the radiation guides 21 and 22 must be of the same value. For a distance of, for example, 200 $\mu$m this means that the distance over which the radiation guides 21 and 22 must extend apart is approximately 12 mm (60×200 $\mu$m). As a result of this the dimensions of such coupling devices at least in the longitudinal direction become very large so that the dimensions of the available semiconductor substrates may start to form a restriction and as a result of which yield problems in the manufacture of such devices will also occur. This disadvantage becomes the larger according as the semiconductor device is to comprise more coupling devices. The required substrate surface area also becomes larger as a result of the fact that the radiation guides 21 and 22 are juxtaposed and (hence) each occupy a part of the substrate surface.

Figure 2:
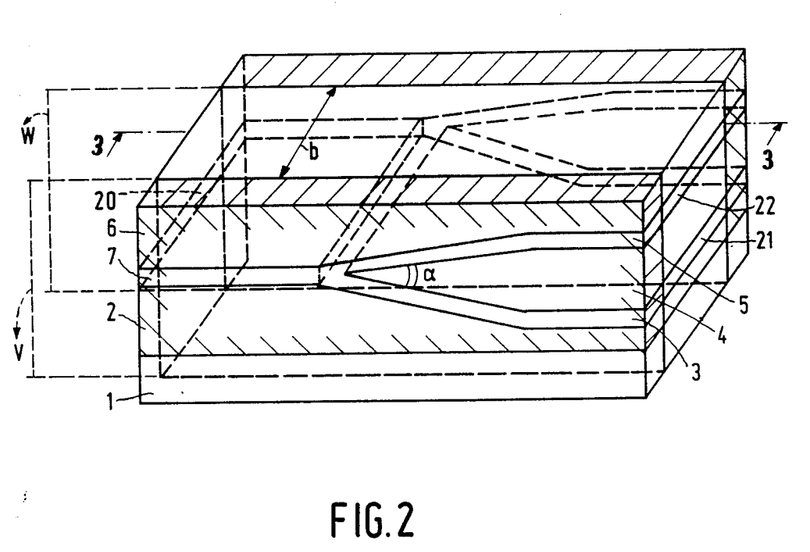
FIG. 2 is a diagrammatic perspective view of a first embodiment of a coupling device according to the invention.
Figure 3:
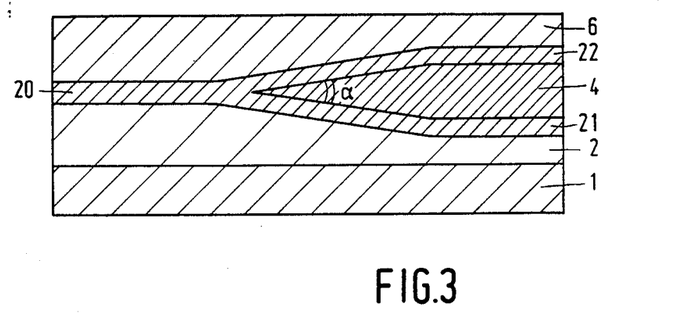
FIG. 3 is a diagrammatic cross-sectional view taken on the line III—III of the coupling device shown in FIG. 2, FIGS. 4 to 9 show the coupling device of FIG. 3 in sucessive stages of the manufacture.

FIG. 2 is a diagrammatic perspective view of a first embodiment of a coupling device according to the invention. FIG. 3 is a diagrammatic cross-sectional view of the device taken on the line III—III of FIG. 3. The device shown in these Figures for coupling electromagnetic radiation according to the invention comprises a first strip-shaped radiation guide 20 which at one end divides into at least two further strip-shaped radiation guides 21 and 22. All the radiation guides are bounded by a material having a lower refractive index than the radiation guides as will be further explained hereinafter. The coupling device comprises a semiconductor body having a semiconductor substrate region 1, in this example consisting of monocrystalline gallium arsenide. Herein is provided a semiconductor layer structure having, in a cross-section in the direction of thickness, a first passive layer 2 and two radiation-guiding active layers 3 and 5 each comprising a further strip-shaped radiation guide, radiation guide 21 in layer 3 and radiation guide 22 in layer 5. The radiation-guiding layers 3 and 5 are separated from each other by a second locally interrupted passive layer 4 having a lower refractive index for the said radiation. At the area of the said interruption the two active radiation-guiding layers 3 and 5 unite to form one active radiation guiding layer 7 which comprises the first radiation guide 20. Above the radiation guiding layers 5 and 7 a third passive layer 6 is present. The passive layers 2, 4 and 6 consist of aluminium gallium arsenide having an aluminium content of 30 at. % and a refractive index of 3.42, while the active layers 3, 5 and 7 consist of aluminium gallium arsenide having an aluminium content of 10 at. % and a refractive index of 3.59. Those parts of the semiconductor layer structure which are situated before surface V and behind surface W in the semiconductor body are contaminated with zinc atoms. The strip-shaped radiation guides which are situtated between the surfaces V and W are hence bounded within the semiconductor layer of which they form part by a material having a lower refractive index. As a result of this radiation which, for example, has a wavelength of approximately 750 nm is hardly absorbed in the radiation guiding layers 3, 5 and 7 and in the direction transverse to the semiconductor layer structure is guided by the passive layers adjoining the radiation-conductive layers. The guiding within the radiation-guiding layer is produced by the regions adjoining each radiation guide and contaminated with zinc atoms.

The conductivity type of the radiation guiding semiconductor layers is not very critical and will in general depend on the growth technique used for the manufacture. What is desired in connection with free charge carrier absorption and undesired scattering of the radiation, is that that doping concentration in each radiation guiding semiconductor material is as low as possible.

Figure 4:
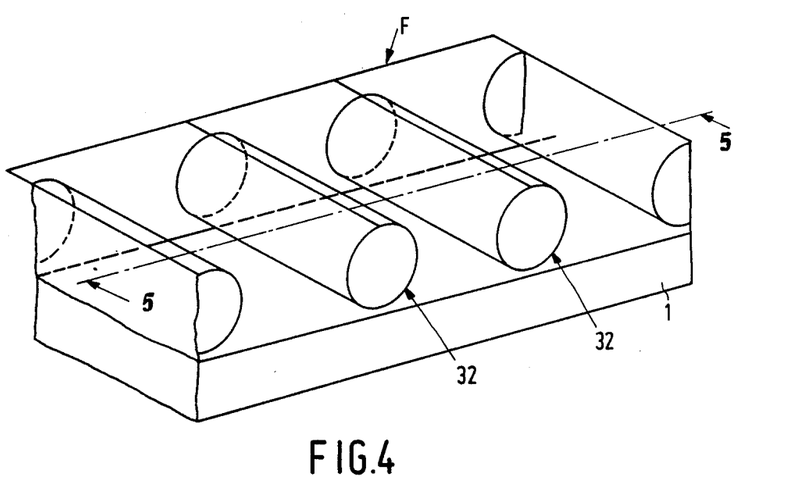
Figure 5:
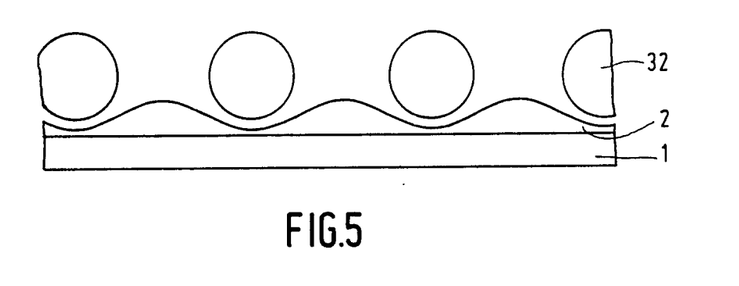
Figure 6:
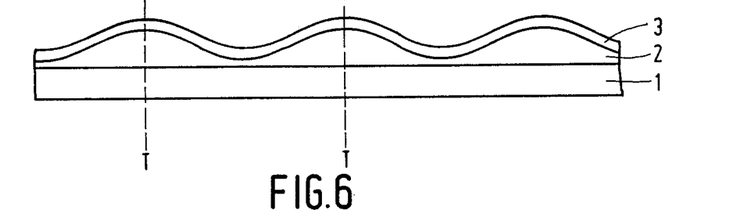
Figure 7:
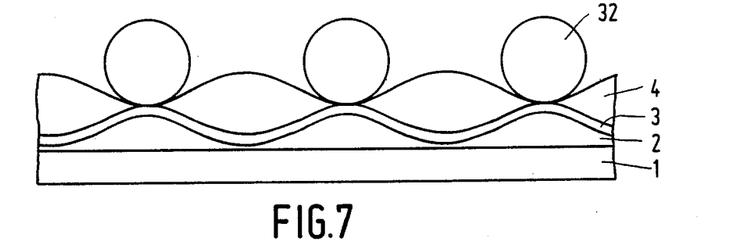
Figure 8:
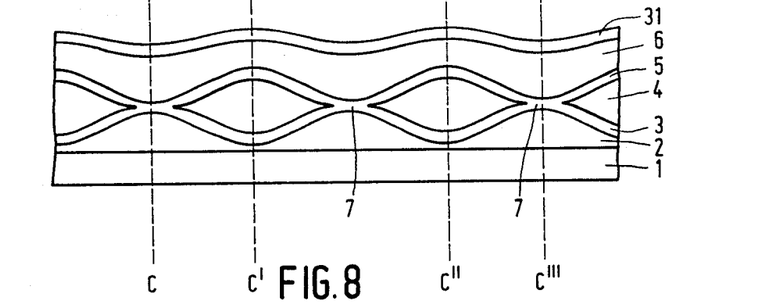
Figure 9:
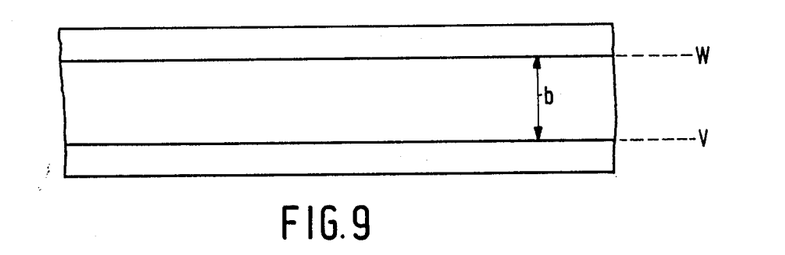

The coupling device according to the invention described in this example may be manufactured, for example, as follows (see FIG. 4). Starting material is a substrate 1 of monocrystalline gallium arsenide with, for example, a (001) orientation. Above the substrate a number of cylindrical rods 32 having a diameter of, for example, 1 mm, are placed parallel to the (110) direction of the substrate. The cylindrical rods form part of a grid F having a pitch of 2 mm. The cylindrical rods 32 just do not contact the surface of the substrate 1. Hereon an undoped 5 to 10 $\mu$m thick layer 2 consisting of $Al_{0.30}Ga_{0.70}As$ is grown, for example, from the gaseous phase by pyrolytic decomposition of organometallic compounds, for example, trimethyl gallium and trimethyl aluminium and of, for example, arsene, which process is known an OMVPE (=Organo Metallic Vapour Phase Epitaxy). The thickness of layer 2 is to be understood to mean herein the maximum thickness which layer 2 has and which is achieved exactly centrally between two juxtaposed cylindrical rods 32 (see FIG. 5). As a result of shadow effect of the cylindrical rods 32, the layer thickness of the layer 2 exactly below the rods becomes minimum, for example, a few micrometres. This shadow effect is reached due to the fact that the OMVPE process takes place in the so-called diffusion-limited region. The use of masks to taper semiconductor layers in this manner is already known per se (see EP 0057587). For details with respect to the said growth technique reference is made to the survey article by M. J. Ludowise, "Metalorganic chemical vapour desposition of III—V semiconductors" in Journal of Applied Physics, 58 (1985) 31. The grid F with the cylindrical rods 32 is then removed after which the growth process is repeated (see FIG. 6). An undoped approximately 1 $\mu$m thick layer 3 consisting of $Al_{0.10}Ga_{0.90}As$ is grown over layer 2. The growth process is interrupted and the grid F with cylindrical rods 32 is again placed on the semiconductor layer structure and that in such a manner that the cylindrical rods 32 bear exactly on tops of the semiconductor layer structure denoted in FIG. 6 by T. The growth process is repeated and an undoped approximately 5 to 10 $\mu$m thick layer 4 consisting of $Al_{0.30}Ga_{0.70}As$ is grown over the structure with which the structure of FIG. 7 is obtained. The grid F with the cylindrical rods 32 is then removed again and the growth process is continued. On the structure an approximately 1 $\mu$m thick semiconductor layer 5 which consists of $Al_{0.10}Ga_{0.90}As$ and which locally unites with semiconductor layer 3 and forms semiconductor layer 7 there and finally an approximately 5 $\mu$m thick semiconductor layer 6 consisting of $Al_{0.30}Ga_{0.070}As$ are grown on the structure (see FIG. 8). Finally, a thin, for example, 0.2 $\mu$m thick layer 31 consisting of silicon dioxide is provided on the layer structure by means of, for example, sputtering or pyrolytic deposition. A plan view of the structure shown in FIG. 8 is shown diagrammatically in FIG. 9. Layer 31 in so far as it is outside the surfaces V and W, is etched away by means of photolithographic techniques and conventionally used etchants (see FIG. 9).

The semiconductor body is then provided in a quartz capsule with zinc arsenide ($ZnAs_2$). By heating the capsule at 700° C. for approximately three hours zinc atoms diffuse into the semiconductor body outside the strip-shaped region consisting of silicon dioxide which is present between the surfaces V and W, into the semiconductor layer 2 down to a depth of approximately 10 $\mu$m. In this manner the strip-shaped radiation guides between C and C' in FIG. 8 referred to by 20, 21 and 22 in FIG. 3 are formed in the radiation guiding layers 3, 5 and 7. In the width direction the said radiation guides are bounded by the material which as a result of the zinc atoms present at that area has a lower refractive index than the radiation guiding layers between the surfaces V and W. The distance b between the surfaces V and W is chosen to be so that, taking into account lateral diffusion, the radiation guides obtain the desired width of, for example, 3 $\mu$m. Finally the structure of FIG. 8 is severed in the (110) direction in the places denoted by C and C', with which a specimen of the coupling device of FIGS. 2 and 3, namely a single vertical Y-shaped structure of radiation guides, is obtained.

Figure 10:
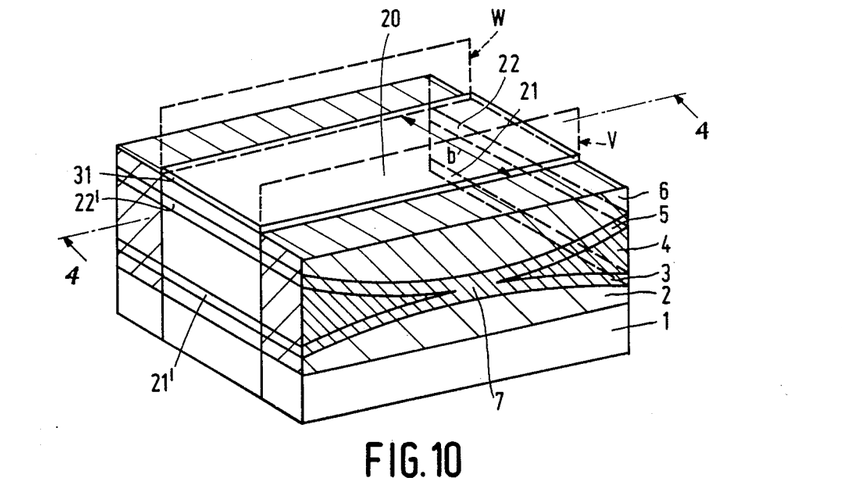
FIG. 10 is a diagrammatic perspective view of a second embodiment of a coupling device according to the invention.
Figure 11:
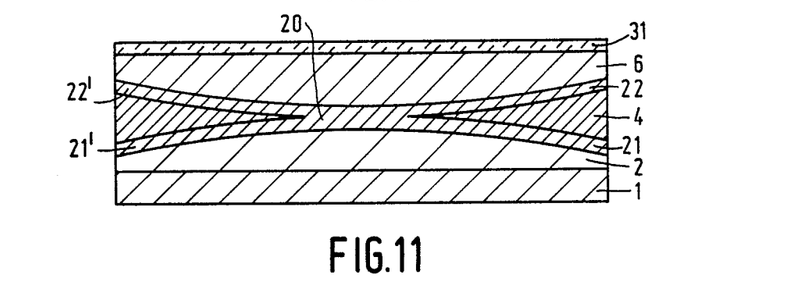
FIG. 11 is a diagrammatic cross-sectional view taken on the line XI—XI of the coupling device shown in FIG. 10.

A second embodiment of a coupling device according to the invention is formed by the device shown in the diagrammatic perspective view of FIG. 10. A diagrammatic cross-sectional view taken on the line XI—XI is shown in FIG. 11. This coupling device also comprises a semiconductor body having a semiconductor substrate region 1, in this example consisting of monocrystalline galliumarsenide. Hereon is provided a semiconductor layer structure having, in a cross-section in the direction of thickness (see FIG. 10), a first passive layer 2 and two radiation guiding active layers 3 and 5 which are separated from each other by a second passive layer 4 having a lower refractive index for the said radiation than the radiation-guiding active layers, which layer 4 is locally interrupted. At the area of the interruption the two active radiation-guiding layers 3 and 5 unite to form one active radiation guiding layer 7 which comprises a first radiation guide 20. Said radiation guide bifurcates at one end into two further radiation-guides 21 and 22 and at the other end into further radiation guides 21' and 22'. A third passive layer 6 is present above the radiation-guiding layers 5 and 7. The passive and active layers have the same compositions and refractive indices as the corresponding layers from the preceding example.

The semiconductor coupling device of this example may be manufactured in a manner analogous to that of the coupling device of the preceding example. The only difference relates to the last step of the manufacturing method of the coupling device of the preceding example. This step, namely the severing of the structure shown in FIG. 8, is now performed along the lines C' and C".

When only a few radiation guides are to be formed in such a semiconductor layer structure (see FIGS. 10 and 11), for exmaple, the radiation guides 20, 22 and 22', this may be done inter alia by performing the diffusion of zinc atoms mentioned hereinbefore either for a shorter period of time or at a lower temperature in such a manner that the depth of the diffusion is smaller than the sum of the layer thicknesses of the semiconductor layers 5 and 6 at the area of the radiation guiding layer 7. The zince diffusion may also be deeper locally. This may be realised, for example, by initially keeping the places where a shallow zinc diffusion is desired coated with silicon dioxide. The zinc diffusion is then interrupted at a suitable instant after which the coating in the last mentioned places is (also) removed and the diffusion is continued. In this manner two radiation guides one above the other may be present locally in the structure of FIG. 10, for example, radiation guides 21 and 22, while elsewhere only the top radiation guide, for example, radiation guide 22', is formed. This may advantageously be used as will become apparent from an example to be described hereinafter.

It is to be noted again that there are several manners to produce the guiding in the direction of width of the radiation guides. First of all, for example, the local etching away of the semiconductor body mentioned hereinbefore may be done so that strip-shaped radiation guides remain. The width b of the radiation guides of FIG. 10 is then adjusted as follows: by means of conventionally used photolithographic techniques and using conventionally used etchants in the semiconductor layer structure of FIG. 10, the semiconductor layer structure outside the faces V and W, the distance b of which is, for example 3 μm, may be etched away down to the substrate region 1.

Besides the local zinc diffusion mentioned hereinbefore a local implantation of zinc ions or of hydrogen ions (protons) also belongs to the possibilities to provide a difference in refractive index so that strip-shaped radiation guides are formed. All the said techniques also present the possiblity of optionally forming one or more radiation guides one above the other.

Figure 12:
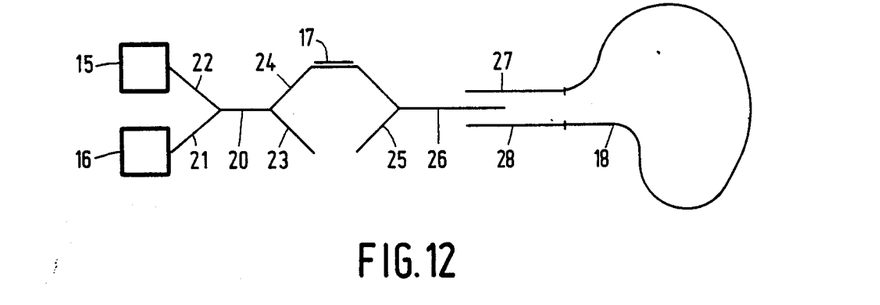
FIG. 12 shows diagrammatically an optical glass fibre gyroscope according to the invention.

A coupling device according to the invention may be used advantageously inter alia in a optical glass fibre gyroscope. Such a gyroscope is shown diagrammatically in FIG. 12 and may comprise inter alia: a radiation-emitting semiconductor diode 15 (for example, a LED or laser), a radiation-sensitive detector 16 (for example, a photodiode), nine radiation guides 20, 21, 22, 23, 24, 25, 26, 27 and 28, an electrode 17 which is present above a part of radiation guide 24 and a loop-shaped glass fibre 18 one end of which is couple to the radiation guide 27 and the other end of which is coupled to the radiation guide 28. The radiation emitted by the radiation source is partly coupled in radiation guide 20. This radiation is divided into two equal parts a number of times in so-called 3 dB couplers. The first 3 dB coupler is formed by radiation guides 20, the second by radiation guide 26. The radiation which is present in the radiation guides 27 and 28 traverses the glass fibre loop 18 in the opposite direction. When the FIG. 12 device rotates about an axis which is perpendicular to the plane in which the glass fibre loop is situated, a phase difference arises between two radiation parts which depends on the velocity of rotation of the device. This phase difference can be measured by means of the detector 16. The electrode 17 forms a polariser which ensures that the opposed radiations have the same polarisation states.

Figure 13:
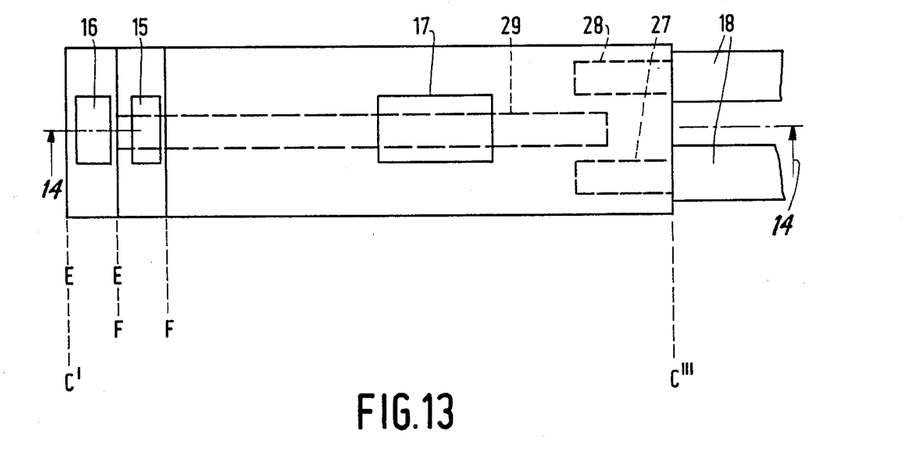
FIG. 13 is a diagrammatic plan view of the optical glass fibre gyroscope shown in FIG. 12.

An embodiment of a part of an optical glass fibre gyroscope in which coupling devices according to the invention are used is shown in the diagrammatic plan view of FIG. 13. It relates to a gyroscope which is integrated for the greater part and of which a cross-sectional view taken on the line XIV—XIV is shown diagrammatically in FIG. 14. The device comprises (see FIG. 14) a semiconductor substrate region 1, in this case consisting of monocrystalline gallium arsenide. Hereon a semiconductor layer structure is provided which inter alia comprises at least a first passive layer 2 having thereon a first radiation-guiding layer 3 and a second radiation guiding layer 5 which are separated from each other by a second passive layer 4 and which in two places unite to form one radiation-guiding layer 7. Hereabove a third passive layer 6 is present. Material and composition of the layers are again equal to those in the preceding examples. In the semiconductor layer structure a number, in this case 9, of radiation guides 20, 21, 22, 23, 24, 25, 26, 27 and 28 are formed by means of a zinc diffusion outside the strip-shaped regions 27, 28 and 29 (see FIG. 13) and the depth of which is denoted by the line (see FIG. 14). The radiation guides 27 and 28 are visible only in FIG. 13. Two recesses EE and FF are provided in the layer structure. EE reaches to just down below the layer 3 and herein a deterctor 16 is placed which consists, for example, of a silicon photodiode which can detect radiation from layer 3. FF reaches down to just below the layer 5 and herein a radiation source 15 is placed which consists of a semiconductor diode laser or a LED the radiation of which at least partly can reach layer 5. A strip-shaped guide 17 which may serve as a polariser for the underlying radiation guides 24 in the radiation-guiding layer 5 is present on the surface of the device. A loop-shaped glass fibre 18 is coupled to the radiation guides 27 and 28 (see FIG. 13) which together with the radiation guide 26 constitute a horizontal y-shaped structure of radiation guides. So in this example both horizontal and vertical Y-shaped structures of radiation guides are used. As regards the radiation guides 23 and 25 it is to be noted that these are interconnected by the radiation guiding layer 3 at the area where line 13 lies above the layer 3. As a result of this the said radiation guides at the area where the line 13 intersects the layer 3 have one non-reflecting end and the radiation which emanates from the radiation guide 20 in 23 or from 25 in 25 will not be reflected. This is desired for a good operation of the vertical coupling devices consisting of the radiation guides 20, 23 and 24 and of the radiation guides 24, 25 and 26 in the present application (optical gyroscope).

Figure 14:
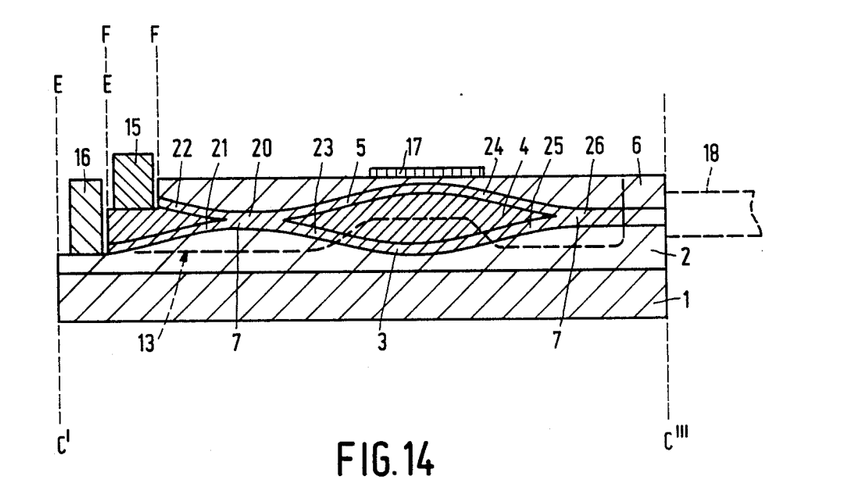
FIG. 14 is a diagrammatic cross-sectional view taken on the line XIV—XIV of the optical glass fibre gyroscope shown in FIG. 12.

The manufacture of the gyroscope described in this example with coupling devices according to the invention is analogous to the manfacture of the preceding examples. In FIGS. 8 and 14 the semiconductor layer structure of the above described gyroscope is indicated by C', C'''. On the basis of the above it will be obvious that with regards to the manufacture of the structure of FIGS. 13 and 14, at least as far as the semiconductor layer structure is concerned, the only difference with the preceding examples resides in the place(es) where the structure of FIG. 8 is to be severed. This should be done at C', and C''' (see FIG. 8). Before the substrate is severed in this manner as a result of which the device shown in FIGS. 13 and 14 is formed, the recesses EE and FF are provided by means of photolithography and conventionally used etchants. In the same manner the electrode regions 17 are formed from a conductor layer, for example, consisting of a gold-germanium-nickel layer, sputtered on the layer structure. After severing the detector, the radiation source and the glass fibre loop are provided by means of conventionally used techniques. When the passive layers 2 and 4 are readily electrically conductive a metal layer may be provided in the bottom of EE and FF, for example, simultaneously with the conductor layer from which the electrode 17 is made. In this manner a connector which is common for both, the detector and radiation source may be integrated. Also more sophisticated forms of integration in which one or more layers of the semiconductor layer structure of the radiation source or detector form part of the semiconductor layer structure of the coupling device according to the invention, are possible.

The invention is not restricted to the examples described since many modifications and variations are possible to those skilled in the art without departing from the scope of this invention. For example, semiconductor materials other than those mentioned in the examples may by used. The layer thicknesses may also by varied in accordance with the desired application. The semiconductor layer structures may also be realised fully or partly with other growth techniques than the OMVPE used here. Notably, other conventionally used growth techniques are to be considered, for example, molecular ray epitaxy, abbreviated MBE (=Molecular Beam Epitaxy) and liquid phase epitaxy, abbreviated LPE (=Liquid Phase Epitaxy). Coupling devices according to the invention may be combined with other, for example, horizontal coupling devices and other active or passive opto-electronic components in many manners. Besides in the field of the glass fibre gyroscope, applications also reside in the field of the optical glass fibre communication systems and in that of the so-called "integrated optics" of which the optical computer constitutes an example.

I claim:

1. A device for coupling electromagnetic radiation, comprising at least a strip-shaped first radiation guide which on at least one end bifurcates into at least two further strip-shaped radiation guides, all of said radiation guides being bounded by a material having a smaller refractive index for the said radiation than the radiation guides, wherein the improvement comprises the radiation guides form part of a semiconductor layer structure having, in a cross-section in the direction of thickness, at least two radiation guiding layers which each comprise a further strip-shaped radiation guide and are separated by a passive layer having a lower refractive index for the said radiation, the passive layer being tapered in the direction of the strip-shaped first radiation guide, and at the area of the strip-shaped first radiation guide the two radiation guiding layers are present within each others' amplification profile and constitute the first radiation guide, the semiconductor layer structure being present between two further passive layers having a smaller refractive index for the said radiation than the radiation guiding layers, and each radiation guide is laterally bounded by regions of the radiation guiding layer that have a lower refractive index formed by at least one of: contamination with zinc atoms, and a disturbed crystal lattice by implantation of H+ ions.

2. A device as claimed in claim 1, wherein in at least one portion of the surface the semiconductor layer structure is removed down to a depth which is larger than the depth at which a radiation guide is located and in the recess thus formed an opto-electronic component is provided in such a way that radiation can be transmitted to and from the said component to the radiation guide.

3. A device as claimed in claim 2, wherein at least one of the layers which form part of the opto-electronic component also forms part of the layer structure in which the coupling device is manufactured.

4. A device as claimed in claim 1, wherein the device forms part of an optical gyroscope in which the semiconductor layer structure in a direction substantially parallel to the semiconductor layer structure comprises successively at least a first strip-shaped radiation guide which at one end is divided into two further strip-shaped radiation guides one of which is coupled to a radiation source and the other of which is coupled to a radiation sensitive detector and which at the other end is divided into two further strip-shaped radiation guides one of which is present in the proximity of an electrode and together with another strip-shaped radiation guide forms a bifurcation of a second strip-shaped radiation guide the other end of which is present within the amplification profile of two again other further strip-shaped radiation guides which at the other end are coupled to a loop-shaped glass fiber.

5. An electronic radiation coupling device comprising:
   a substrate;
   a first passive semiconductor layer disposed on said substrate;
   an active semiconductor layer disposed on said first passive layer, said active layer being bifurcated in a direction perpendicular to the plane of said substrate;
   a second passive semiconductive layer disposed between the bifurcated portion of the active layer;
   a third passive seimconductor layer disposed atop said active layer;
   said passive layers a lower index of refraction than said active layer; and
   lateral semiconductor boundary layers disposed along the sides of the substrate said lateral boundary layers having an index of refraction lower than that of said active layer to thereby enclose said active layer along all sides in material having a lower index of refraction.

6. The device as claimed in claim 5, wherein said boundary layers having a low refractive index are formed by at least one of contamination with zinc atoms and a disturbed crystal lattice caused by implantation of H+ ions.

* * * * *